Nov. 24, 1942.  M. W. CREW  2,302,678

BAROMETRIC REGULATOR

Filed April 19, 1941

INVENTOR
MORRIS W. CREW
BY
Hyde and Meyer
ATTORNEYS

Patented Nov. 24, 1942

2,302,678

UNITED STATES PATENT OFFICE 2,302,678

BAROMETRIC REGULATOR

Morris W. Crew, Shaker Heights, Ohio, assignor to The Hotstream Heater Company, Cleveland, Ohio, a corporation of Ohio Application April 19, 1941, Serial No. 389,303

2 Claims. (Cl. 236—45)

This invention relates to improvements in a barometric regulator or balanced draft damper.

One of the objects of the present invention is to provide a draft damper controlling the flow of atmospheric air into breeching leading to a stack or the like, together with a spring biasing the damper toward closed position and power means for varying the tension of the spring so as to control the draft.

Other objects and advantages reside in the arrangement of the various parts for carrying out my invention and the essential features thereof will be summarized in the claims attached hereto.

Figure 1:
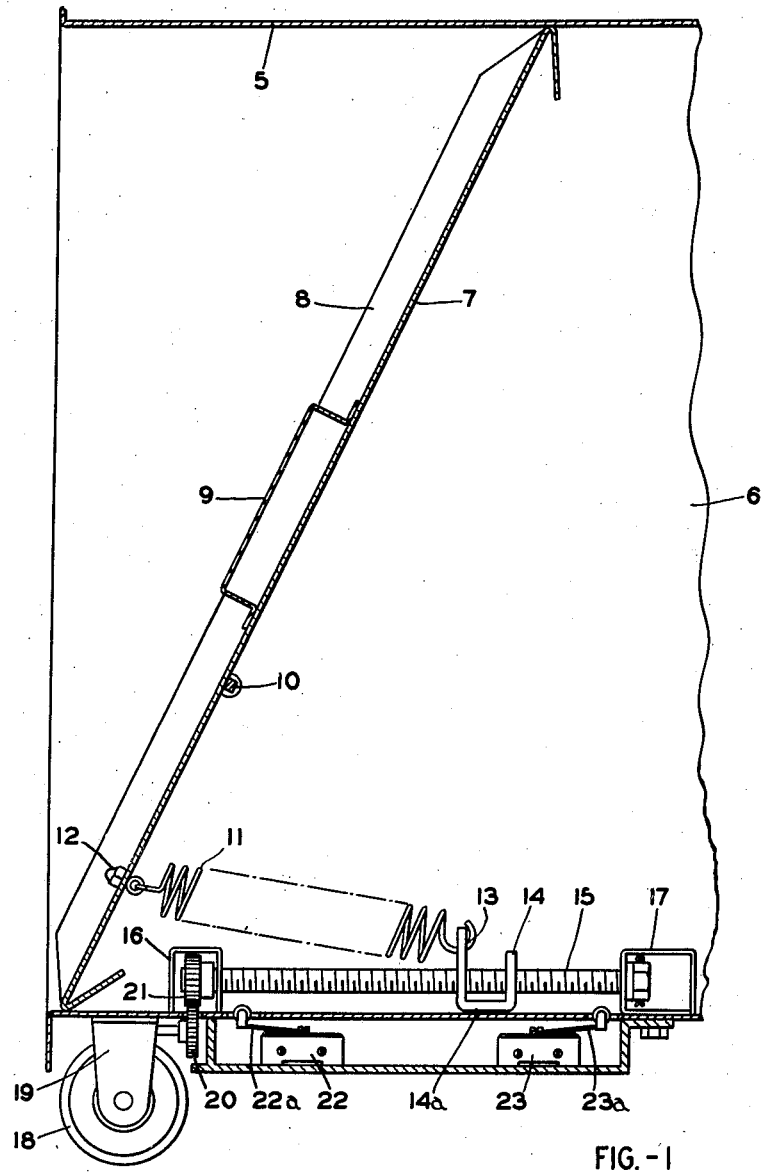
Figure 2:
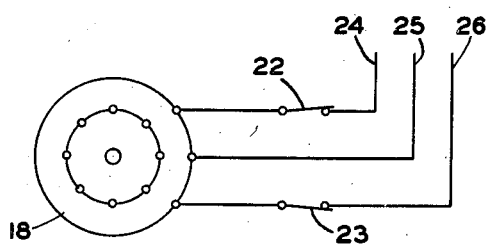

In the drawing, Fig. 1 is a sectional view through a portion of a flue equipped with my improved damper and control means therefor; and Fig. 2 is a diagram representing electrical wiring for the device of Fig. 1.

It will be understood that apparatus of this sort is generally supplied in an open ended flue 5 which connects at the end 6 with breeching leading to a stack or the like, with the forces tending to close the damper 7 acting in opposition to the tendency of the draft or suction in the breeching 6 tending to open the damper. Thus if the draft becomes too great the damper is opened admitting atmospheric air through the flue 5 and conversely if the draft is insufficient the damper 7 closes so as to cut off the inflow of atmospheric air.

It will be understood that the damper 7 is a sheet of metal or the like substantially closing the flue 5 and reinforced by vertically extending angles 8 and by a horizontally extending channel 9. This damper is pivoted on shaft 10 which has suitable bearings (not shown) in side walls of the flue 5. A spring 11 connected between the point 12 at the lower portion of the damper and the point 13 on a member 14 to be later described urges the damper in counterclockwise direction about its axis 10 toward closed position. In the form here shown the pivot 10 is below the center of the damper so that the greater weight of the damper above this point causes the damper to follow the control of spring 11. In other words the weight of the damper above its axis tends to open it and the pull of the spring tends to close it.

Means is provided for varying the tension of spring 11 so as to change its effect upon the damper 7. The means here shown comprises a screw 15 having threaded engagement with the member 14. This member is a U-shaped bracket having a flat face at 14a engaging a bottom wall of the flue 5 so as to prevent rotation of the member 14 relative to the screw 15. The screw has bearings at its opposite ends in suitable brackets 16 and 17 carried by the flue wall.

Power means is provided for rotating the screw 15. This comprises a motor 18 suitably mounted on a bracket 19 and driving, through reduction gearing if necessary, a pinion 20 which, through an opening in the wall of flue 5, drives a coacting pinion 21 rotatable with the screw 15. The motor 18 is reversible and therefore movement in one direction will cause member 14 to travel along screw 15 in a direction to increase the tension of spring 11, whereas movement of the motor in the opposite direction will cause a decrease in tension of the spring 11.

Means is provided for stopping motor 18 when the member 14 reaches either end limit of its travel. This comprises the limit switches 22 and 23 which may conveniently be of the type disclosed in Patent No. 1,960,020, granted May 22, 1934, to P. K. McGall. When the member 14 reaches the left end of its travel it depresses the blade 22a of switch 22 by striking the roller carried by the blade. In a similar manner at the right end of its travel switch 23 is opened by movement of its blade 23a.

Obviously manual or automatic control may be utilized to vary the position of damper 7 by controlling the tension of spring 11. In Fig. 2 I have shown a conventional wiring diagram showing the motor 18 and the switches 22 and 23 in series therewith. If a decrease in draft is desired then the manual or automatic control will connect line 24 with a source of electric current through motor 18, the circuit being completed through the common wire 25 with the other side of the circuit. If an increase in draft is desired then the control means connects the line 26 with the source of electric current, the circuit being completed through motor 18 and line 25. It will be understood that the circuit 24, 25 produces the reverse direction of movement of motor 18 as compared with the circuit 26, 25.

What I claim is:

1. In combination, a draft responsive damper pivotally mounted in a flue, a helical spring having one end connected with said damper and tending to move said damper to closed position, a member supporting the other end of said spring, a screw located along the inner face of a wall of said flue and having a threaded connection with said member, said member slidingly engaging said flue wall to prevent said member from turning, a motor mounted on the outer face of a wall of said flue, and a driving connection between said motor and said screw extending through said flue wall.

2. In combination, a draft responsive damper pivotally mounted within the walls of a flue, a screw mounted on said walls for rotation about the screw axis, a motor mounted on the walls of the flue and having a driving connection with said screw for rotating the latter, a member having threaded engagement with said screw, means preventing rotation of said member relative to said screw, and a helical spring connected between said member and said damper, the parts being so positioned that said spring normally tends to close said damper.

MORRIS W. CREW.